Aug. 12, 1969  T. R. SERGEANT  3,461,446
FLUID-LEVEL DETECTING APPARATUS
Filed July 2, 1965
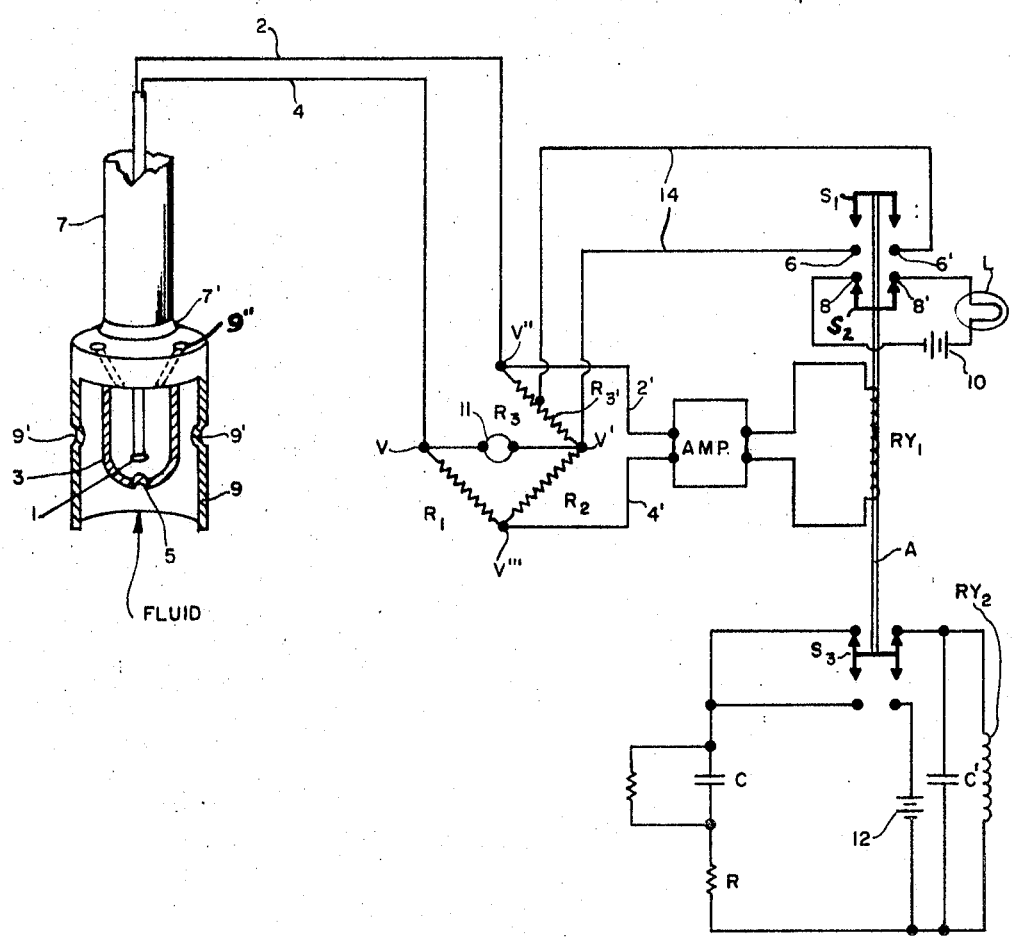
INVENTOR.
THOMAS R. SERGEANT
BY
*Rines and Rines*
ATTORNEYS United States Patent Office
3,461,446
Patented Aug. 12, 1969

3,461,446
FLUID-LEVEL DETECTING APPARATUS
Thomas R. Sergeant, Holliston, Mass., assignor to Scully Signal Corporation, Melrose, Mass., a corporation of Massachusetts
Filed July 2, 1965, Ser. No. 469,194
Int. Cl. G08b 21/00
U.S. Cl. 340—244                                     7 Claims

ABSTRACT OF THE DISCLOSURE

This disclosure deals with improved circuit-checked foam-detecting systems in which means is provided to insure against spurious parameter changes of the sensor indicating the reception of the foam to be detected during the circuit checking of the system.

---

The present invention relates to fluid-level detecting apparatus and, more particularly, to apparatus employing sensors for detecting the presence of an event thereat, such as temperature-sensitive thermistors, thermocouples, bimetal devices and resistance elements, to mention but a few.

Fluid-level detectors for such purposes are described, for example, in United States Letters Patent Nos. 2,798,213 and 2,807,011 issued to William G. Rowell and assigned to Scully Signal Company. In said Letters Patent, electrical circuits are also described for continually checking the operability of the sensor monitoring apparatus and, in some cases, the sensor itself. There are, however, occasions where such circuit checking is effected only in the monitoring circuit and not at the sensor itself. The sensor, moreover, could be activated by some spurious phenomenon, and such monitoring-system circuit-checking would not so indicate. In the case of thermistor fluid-level sensors used in such systems, for example, the checking system, though correctly indicating operability of the monitoring circuit, would not be able to detect the spurious condition that foam in the fluid had changed the electrical parameters of the sensor and not the actual fluid level—giving a premature and false (though safe) indication that the desired level had been reached. Similarly, draft upon the thermistor, occasioned by the high filling rate of a fluid-containing tank, for example, could well change the electrical parameters of the sensor to a value commensurate with that effected by the presence of the desired fluid level—again giving a false, though safe, indication.

An object of the present invention, accordingly, is to provide a new and improved apparatus for enabling circuit-checked event-detecting systems to indicate not only proper continual operation of the monitoring system, but activation of the sensor by the intended event or circumstance only (for example, the proper fluid level), through insuring against spurious parameter changes of the sensor, such as those caused by draft or foam in the case of fluid-level sensors.

A further object is to provide a novel detecting apparatus of more general utility, also.

Still another object is to provide a novel draft- and foam-proof fluid sensor and adapter therefor.

Other and further objects will be explained hereinafter and will be more particularly pointed out in the appended claims. In summary, however, the invention contemplates apparatus for enabling circuit-checked systems of this character to discriminate against spurious activation of the sensor, such as against draft and foam-produced spurious responses in the case of temperature-sensitive fluid sensors; and, more generally, in connection with fluid sensors, a novel chamber and shield construction for rendering the sensor substantially draft and foam-proof.

The invention will now be described with reference to the accompanying drawing, the single figure of which illustrates a preferred embodiment of the shield construction of the invention, partly in longitudinal section, and illustrated in connection with a fail-safe checking monitoring system, though the fluid sensor mounting construction may be used with other systems, also, as before explained.

Referring to the drawing, a thermistor or other temperature-sensitive fluid sensor 1 is shown for illustrative purposes mounted within a protective chamber or housing 3, illustrated as of substantially cylindrical form and provided, preferably substantially centrally along its bottom wall, with a fluid inlet 5. The sensor 1 may be carried by a male fitting 7 that may be connected to the top of the chamber 3, as by a threaded collar at 7'. The sensor 1 is adjusted to the desired predetermined level below the top of the chamber in substantial alignment with the fluid inlet 5. When fluid, such as, for example, petroleum products in a tank being filled, enters the chamber 3 through the aperture 5 (in the direction of the arrow) and reaches the level of the sensor 1, the electrical resistance parameter of the thermistor 1 is radically changed, presenting a different resistance value between electrical terminals 2 and 4 than in the absence of fluid contacting the sensor 1 and thus discriminating between absence and presence of fluid at the sensor.

This may be detected in any desired manner to give an indication or signal, for example, for shutting off the fluid filling operation. In the drawing, the preferred signal monitoring circuit comprises a resistance bridge one input-circuit arm of which is connected between terminals 2 and 4 containing the thermistor resistance, and the other arms $R_1$, $R_2$ and $R_3$ of which are connected to an energy source 11 between opposite vertices V–V', and to conductors 2' and 4' connected between the other pair of opposing vertices V''–V'''. Bridge unbalance signals are applied by conductor 2' and 4' to amplifier stages AMP and thence to an output relay switching device, shown of the electromagnetic-coil and armature type $RY_1$.

In accordance with the circuit-checking fail-safe techniques developed in the said Letters Patent, during the stand-by time before sensor 1 has detected the occurrence of the predetermined fluid level event, the signal in the input is modified at a periodic rate preferably controlled by feedback from the output circuit relay $RY_1$, to check the continual operability of the circuit to respond if the event should occur. In one condition of energization of the coil of $RY_1$, its armature A causes switch contactor $S_1$ to be pulled downward, connecting terminals 6—6 together and shorting, by conductors 14, the portion $R_3'$ of the bridge arm resistance $R_3$. This changes the previous balance condition of the bridge, and, in turn, changes the state of energization of relay $RY_1$, causing the armature A thereof to move upward, disconnecting $S_1$ from 6–6' and connecting switch contactor $S_2$ with terminals 8–8'. This results in lighting an indicator lamp L from an energy source 10. The disconnecting of terminals 6 and 6' re-injects the complete resistance $R_3$ in the bridge and causes a return to the first-named condition or state of relay $RY_1$, and so on, repetitively. The relay thus periodically moves its armature A up and down in checking-signal fashion, as explained in the said Letters Patent, with the rate determined by the parameters of the circuit, such as, for example, once every second or so. Synchronously with such periodic armature movement, a further switch contactor $S_3$ is caused to move down and up on alternate half-cycles to energize or charge a storage capacitor C through a resistance R from a source 12, and then to discharge the capacitor C through a slowly de-energizable load relay or other device $RY_2$ that may control the fluid filling valve (not shown) in well-known manner, in the above example. A holding capacitor C' may shunt the relay $RY_2$ to aid in holding the same energized unless the capacitor C fails to produce its half-cycle discharges; i.e., unless the checking signals fails to be recovered by the periodic action of relay $RY_1$ and thus indicates a malfunction in the detaching system, as explained in the said Letters Patent. The lamp L will thus periodically flash at the circuit-checking rate, giving an indication that the system is operable. By the term "operable," moreover, is meant not only integrity in the circuit, but as indicated by the periodically alternately different bridge arm values $R_3$ and ($R_3$–$R_3'$), that the resistance of the sensor 1 is checked as maintained between corresponding predetermined low and high resistance parameter values desired for proper operation. In the case of a 500-ohm (25° C.) glass-encapsulated thermistor, for example, (Fenwall Company, Ashland, Mass.), the resistance $R_T$ may be periodically thus checked between the following low-high limits:

$$217 \text{ ohms} > R_T > 141 \text{ ohms}$$

Once the sensor 1 is contacted by the fluid, however, the radical change in its resistance parameter causes the amplifier AMP to hold the relay $RY_1$ in its illustrated state, for example, keeping lamp L lit and thus indicating the reaching of the desired fluid level. Load relay $RY_2$ will then sut off the fluid valve, if desired.

Unfortunately, however, as before explained, draft upon the thermistor 1 and/or foam at the top of the fluid can produce spurious effects upon the sensor 1 that are similar to the resistance parameter changes effected by actual fluid contact and thus simulate the occurrence of the desired material level. Though the monitoring system may then indicate in a safe manner the desired fluid level, this will be a false indication.

In accordance with a feature of the invention, the fail-safe nature of the system is rendered also capable of accurate event response and of discrimination against spurious signals, by causing the sensor 1 to be insensitive to such spurious phenomena as draft and foam. This is shown effected with the aid of a preferably cylindrical, coaxial externally mounted shield 9 depending from the top of the chamber 3, so as to be interposed between the sensor and any events or phenoma which may be detected thereby, and defining a fluid-receiving volume there-between that, in practice, has been found preferably to be small compared with the chamber volume. For example, in the case of fuel oil level detection, a chamber cross-dimension that is more than half the cross-dimension of the shield 9 is most satisfactory. The bottom open end of the shield 9 is extended well below the aperture 5 to shield or protect the aperture 5 and the sensor 1 from laterally directed drafts, such as those produced during rapid fluid filling. The lower peripheral edge of the shield 9, moreover, has been found simultaneously to perform the most advantageous further feature of cutting or deflecting and dissipating much of any foam head carried by the fuel and which is received by the shield before it can reach the sensor. The internal aperture 5 together with the preferably rounded bottom wall of the chamber 3 serve further to dissipate foam and prevent the same from spuriously contacting the sensor 1. Fluid and foam, moreover, are forced, also, into the volume between the outer walls of the chamber 3 and the inner wall of the shield 9. By disposing apertures 9' communicating this volume to the exterior, preferably at a level above that of the sensor 1 (to insure that fluid is at least above the sensor if any bubble or vapor lock occurs), the venting of both fluid and foam is effectively accomplished. Top apertures 9'', communicating the interior of the chamber 3 with the exterior thereabove, aid in venting the chamber and breaking vapor locks therein. In the absence of such vapor lock elimination, the fluid could rise above the desired fluid level with the vapor bubble preventing fluid contact with the sensor 1.

While the invention has been described in connection with fluid-level detection, it will be clear that the principle of shielding against spurious sensor response in both checked and unchecked systems is clearly applicable to the detection of other types of events with other types of sensors and monitoring systems; and that, as explained in the said Letters Patent, other types of monitoring systems, circuits and switching relay devices, including solid-state relay devices, may also be employed.

What is claimed is:

1. Fluid-level detecting apparatus having, in combination, a sensor discriminatingly responsive to the presence and absence of fluid thereat, a chamber within which the sensor is protectively mounted at a predetermined level below the top thereof, the chamber being provided with a fluid wall-inlet substantially alined with the sensor, an open-ended shield mounted about the chamber to define a fluid-receiving volume therebetween with its open end depending below the chamber inlet simultaneously to protect the sensor from draft and to dissipate foam in the fluid, aperture means disposed in the shield above the said predetermined level of mounting of the sensor to provide external communication with the said volume, and further aperture means venting the said top of the chamber.

2. Fluid-level detecting apparatus having, in combination, a sensor electrically discriminatingly responsive to the presence and absence of fluid thereat and of electrical parameters lying within predetermined low and high values, a chamber provided with a fluid wall-inlet and means for receiving and protectively mounting the sensor at a predetermined level below the top thereof in substantial alinement with said inlet, an electrical signal monitoring circuit having an input and an output, means for connecting the input to the sensor to detect when fluid is present within the chamber at the sensor, means for modifying the signal in the input at a predetermined periodic rate to provide in the output a checking signal for insuring not only the continual operability of the said monitoring circuit but the maintenance of the sensor within its said predetermined low and high electrical parameter values, and means for shielding the sensor from draft and fluid foam to prevent a false indication despite the presence of the checking signal in the output that the fluid level has reached the sensor within the chamber, such false indication being caused by spurious effects upon the said parameters by draft and fluid foam, thereby checking that the sensor has responded to the desired level of fluid and not to a spurious condition.

3. Apparatus as claimed in claim 2 and in which the said shielding means comprises an open-ended shield mounted about the chamber to define a fluid-receiving volume therebetween with its open end depending below the chamber inlet simultaneously to protect the sensor from draft and to dissipate foam in the fluid, aperture means disposed in the shield above the said predetermined level of mounting of the sensor to provide external communication with the said volume, and further aperture means venting the said top of the chamber.

4. Apparatus as claimed in claim 2 and in which the said output comprises relay means responsive to the said periodic checking signal and alternately checking whether the sensor is within the said predetermined low and high parameter values.

5. Apparatus as claimed in claim 2 and in which the said modifying means comprises a circuit between the said input and output, the output being further provided with energy storage means respectively chargeable and dischargeable during half cycles of the said periodic rate, and a slowly de-energizable load connected to the energy storage means during the discharge cycle thereof and adjusted to remain energized so long as such alternate discharge cycle occurs.

6. Apparatus for detecting the occurrence of the event of reaching a predetermined material level having, in combination, a sensor discriminatingly responsive to the presence and absence of the predetermined event thereat and of electrical parameters lying within predetermined low and high values and also capable of responding to spurious events which may be received by said sensor due to change of said material level and which simulate the said predetermined event, an electrical signal monitoring circuit having an input and an output, means for connecting the input to the sensor to detect the occurrence of the said predetermined event at the sensor, means for modifying the signal in the input at a predetermined periodic rate to provide in the output a checking signal for insuring not only the continual operability of the said monitoring circuit but the mantenance of the sensor within its said predetermined low and high parameter values, and protective means interposed between the sensor and the events which may be detected thereby for receiving said events prior to said sensor and for preventing said sensor from responding to said spurious events which simulate the said predetermined material level event.

7. Apparatus for detecting the occurrence of the event of reaching a predetermined material level having, in combination, a sensor discriminatingly responsive to the presence and absence of the predetermined event thereat and of parameters lying within predetermined low and high values and also capable of responding to spurious events which may be received by said sensor due to change of said material level and which simulate the said predetermined event, a signal monitoring system having an input and an output, means for connecting the input to the sensor to detect the occurrence of the said predetermined event at the sensor, means for modifying the signal in the input at a predetermined periodic rate to provide in the output a checking signal for insuring not only the continual operability of the said monitoring system but the maintenance of the sensor within its said predetermined low and high parameter values, and protective means interposed between the sensor and the events which may be detected thereby for receiving said events prior to said sensor and for preventing said sensor from responding to said spurious events which simulate the said predetermined material level event.

References Cited

UNITED STATES PATENTS

| | | | |
|---|---|---|---|
| 1,807,821 | 6/1931 | Behr. | |
| 2,626,620 | 1/1953 | Smith | 324—30 XR |
| 2,798,214 | 7/1957 | Rowell | 340—253 XR |
| 2,926,299 | 2/1960 | Rogoff. | |
| 2,929,996 | 3/1960 | Bark. | |
| 3,105,175 | 9/1963 | Siliani et al. | 317—153 XR |

OTHER REFERENCES

AIEE Technical Paper 48–224, "A Polarized Relay as an Aircraft Control Element," by Johnson and Glassow, August 1948, pp. 10, 11 and FIGURE 10.

JOHN W. CALDWELL, Primary Examiner

DANIEL K. MYER, Assistant Examiner

U.S. Cl. X.R.

73—295; 137—392